Patented Oct. 15, 1929

1,732,105

UNITED STATES PATENT OFFICE

FRIEDRICH MERZ, OF FRANKFORT-ON-THE-MAIN, GERMANY

MANUFACTURE OF OINTMENTS, AND PARTICULARLY WATER OINTMENTS

No Drawing. Application filed September 28, 1926, Serial No. 138,331, and in Germany March 30, 1926.

My invention relates to the manufacture of ointments, and particularly water ointments, that is, ointments consisting of tragacanth, glycerine, and water, and it is an object of my invention to provide an ointment of this type which possesses the unctuous character of vaseline and similar ointments, and to this end I employ fermentation fungus cultures in the manufacture of my ointment.

Water ointments as made heretofore and consisting of tragacanth, glycerine and water, are either extremely friable or so thin that their consistence resembles that of mucilage and in both cases the ointment is not as readily applied as vaseline and similar ointments.

Ready application, however, is a very important feature for various cases, for instance, in the case of mercury ointments, and therefore water ointments could not be used at all or not to advantage in such cases.

I have found that the desired unctuous properties are imparted to water ointments, and water ointments may therefore be used in any case, by using fermentation fungus cultures in their manufacture.

It is not necessary that the percentage of such cultures should be very great; on the contrary, very small percentages will generally be sufficient.

Fermentation fungus cultures are obtained, for instance, as follows:

500 weight units of rye or wheat flour or mixed with 500 units of maize starch, 800 units of water, and 100 units of milk, are kneaded with 100 units of leaven, the mixture is allowed to ferment at moderate or warm room temperature and allowed to dry at the same temperature.

The dried mixture, which may be pulverized, is the fungus culture.

For manufacturing an ointment which possesses the above-mentioned good properties as compared with the usual water ointments, I may, for instance, proceed as follows:

I mix .25 units of fungus culture with 8 units of tragacanth and slowly stir this with a 50 per cent aqueous solution of glycerine, to the amount of 100 units. The mixture is heated gradually to the boiling point while being stirred continuously.

When it has cooled it is the ointment with the good qualities aforesaid and which are not found in the ointments made without fungus culture.

Obviously, I am not limited to the proportions of the mixtures constituting the fungus culture and the ointment itself but any suitable proportions may be selected as desired without departing from my invention which is principally based on the use of fungus culture and by which I obtain an ointment which is unctuous and readily applied to the skin and does not involve the drawbacks of the existing water ointments, viz, friability or thinness which make them unsuitable for many purposes.

My novel ointment is far more economical in use than the existing water ointments and by my invention water ointments are rendered suitable for a number of purposes from which they were formerly excluded by their poor qualities.

I claim:

1. The method of manufacturing water ointments comprising preparing fungus culture, mixing it with tragacanth and glycerine solution in water, and heating the mixture to boiling point whereby an ointment sufficiently unctuous for ready application is obtained.

2. A water ointment comprising .25 units of fungus culture, 8 units of tragacanth and 100 units of a 50 percent aqueous solution of glycerine.

3. The method of manufacturing water ointments comprising mixing .25 units of fungus culture with 8 units of tragacanth and stirring slowly with a 50 percent aqueous solution of glycerine to the amount of 100 units, and heating gradually to the boiling point while stirring continuously.

4. The method of manufacturing water ointments which consists in preparing fungus culture by mixing 5 units of rye or wheat flour with 5 units of maize starch, 8 units of water and 1 unit of milk and kneading with 1 unit of leaven and allowing to ferment at a moderate temperature and drying at the same temperature, mixing .25 units of the dried fungus culture with 8 units of tragacanth and slowly stirring with a 50 percent aqueous solution of glycerine to the amount of 100 units and heating gradually to the boiling point while stirring continuously.

In testimony whereof, I have signed my name to this specification.

FRIEDRICH MERZ.